United States Patent [19]
Swanson et al.

[11] 3,745,827
[45] July 17, 1973

[54] TEMPERATURE COMPENSATION OF A LIQUID FLOWMETER

[75] Inventors: Philip E. Swanson, Erie, Pa.; Charles J. Tur, Mequon, Wis.

[73] Assignee: A. O. Smith Corporation, Milwaukee, Wis.

[22] Filed: Feb. 16, 1971

[21] Appl. No.: 115,573

[52] U.S. Cl. ............... 73/233, 73/194 R, 73/231 R
[51] Int. Cl. ............................................. G01f 1/00
[58] Field of Search.................... 73/194 M, 231 M, 73/233, 272 A, 362 AR, 194 R, 231 R

[56] References Cited
UNITED STATES PATENTS

| 3,088,317 | 5/1963 | Steen | 73/233 |
|---|---|---|---|
| 3,006,189 | 10/1961 | Warren et al. | 73/233 |
| 1,996,150 | 4/1935 | Eches et al. | 73/233 |
| 2,901,173 | 8/1959 | Cliques | 73/194 M X |
| 2,203,789 | 6/1940 | Johnson | 73/233 |
| 2,552,017 | 5/1951 | Schwartz et al. | 73/362 AR X |
| 3,494,196 | 2/1970 | Moussette | 73/362 AR |

FOREIGN PATENTS OR APPLICATIONS

| 1,324,294 | 3/1963 | France | 73/233 |

Primary Examiner—Richard C. Queisser
Assistant Examiner—John P. Beauchamp
Attorney—Andrus, Sceales, Starke, et al.

[57] ABSTRACT

A petroleum product bulk plant line includes a flowmeter recorder which is temperature compensated by electrical control signals derived from a bridge circuit including a thermistor inserted within the flow line and a feedback potentiometer coupled to the compensated output. A differential amplifier and a reversible motor switching circuit is connected to the bridge circuit to selectively energize a motor and control an adjustable ratio drive assembly to provide a compensated output to the recorder. An electro-mechanical signal converter is coupled to the flowmeter and generates an electrical signal which is transmitted to a remotely located monitor having a drive assembly and a remotely located recorder. The thermistor within the flow line therefore provides a temperature responsive signal to the remotely located monitor to temperature compensate the drive assembly. The adjustable ratio drive assembly may include a non-linear cam to compensate for changes in the liquid coefficient of expansion.

8 Claims, 7 Drawing Figures

3,745,827
PATENTED JUL 17 1973

INVENTOR.
PHILIP E. SWANSON
CHARLES J. TUR
BY Andrus, Sceales, Starke & Sawall
ATTORNEYS

INVENTORS
PHILIP E. SWANSON
CHARLES J. TÜR
BY
ATTORNEYS 3,745,827

TEMPERATURE COMPENSATION OF A LIQUID FLOWMETER

BACKGROUND OF THE INVENTION

This invention relates to an apparatus for providing temperature compensation in a system monitoring the volumetric liquid flow through a flow line.

Gasoline and similar products are often transmitted through suitable flow or pipe lines to which volumetric flowmeters are connected to automatically establish accurate records of the volume of flow. Generally, the volumetric responsive flowmeter establishes an output in accordance with the volumetric flow through the meter.

Since the volume of metered liquid varies with temperature, due to the well known expansion and contraction characteristics, a recorder connected to the output includes a temperature compensator to measure the volume to a base temperature, generally 60° F. in the United States. Such temperature compensators, for example, may include a roller and disc type variable transmission unit as shown in U.S. Pat. No. 3,135,125, issued June 2, 1964, to Charles D. Erickson, a ball integrating type variable transmission unit as shown in U. S. Pat. No. 3,417,612, issued Dec. 24, 1968, to Cedel, or an eccentric type variable transmission unit employing overriding clutches.

Bulb and bellows units have been employed in temperature compensators to continuously adjust a pivotal lever according to the temperature sensed and coupled to the variable transmission units, as shown in U. S. Pat. No. 3,088,317, issued May 7, 1963, to W. Steen. Specifically, a temperature sensing bulb containing a sensing liquid is placed within or near the liquid flow in close proximity to the meter and is connected through a capillary tube to expand or contract the bellows unit. The sensing liquid therefore expands or contracts according to changes in sensed temperature to correspondingly vary the pivotal lever through the bellows unit. A compensating bellows has also been employed in such unit to compensate the bellows unit output according to ambient temperature conditions occurring within the system.

The effective temperature compensating range between the metered output and a remote monitor in systems employing the bulb and bellows unit has been severely restricted due to the limiting nature of the capillary tube. Remove monitoring systems such as used in petroleum bulk plant operations requiring a gross flowmeter recording and a net compensated recording together with a local gross flowmeter recording would therefore require a dual transmitter and receiver system. In addition, compensating responses have often lagged due to the mechanical nature of the bulb and bellows unit.

SUMMARY OF THE INVENTION

This invention relates to an apparatus for providing temperature compensation in a system monitoring the volumetric liquid flow through a flow line. The present invention particularly provides a novel compensating system for bulk loading plants and the like employing remote recording means and more particularly in such plants when both gross and net volumetric flow readings are desired.

In accordance with the present invention, a sensing means is connected to a flow line and provides an electrical signal proportional to the temperature of the flowing liquid. Means are provided for supplying a first output proportional to the gross volumetric liquid flow while electro-responsive means are further provided which are actuated by the first output and selectively controlled by the temperature related electrical signal supplied by the sensing means for providing a temperature compensated second output proportional to the net flow.

In one form of the invention, an apparatus is provided to adjust a variagle element in an adjustable ratio drive assembly for providing a temperature compensated output proportional to the volumetric liquid flow. A compensating means includes a motor means coupled to the temperature responsive sensing means and correspondingly energized for varying the element in response to temperature changes in the liquid flow.

The sensing means is advantageously a thermistor or a like direct sensing variable means providing an impedance varying in response to fluid temperature and connected in circuit with a motor actuated impedance means which provides an impedance varying in response to actuation of the motor means. A closed loop control circuit including the sensing means and the motor actuated impedance means is connected in a balancing circuit such as a wheatstone bridge to selectively energize the motor means in response to temperature changes of the liquid.

The sensing means and motor actuated impedance means are connected with a pair of related impedance elements in a wheatstone bridge circuit configuration to provide a balanced condition with the ratio drive setting related to the actual liquid temperature. An amplifying circuit is connected to the bridge circuit and is further connected to a switching control circuit. The motor means is connected to the switching circuit and is selectively energized according to the output of the bridge circuit.

In another form of the invention, a volumetric liquid flowmeter having a local register is connected to a liquid flow line to provide a local gross volumetric recording. A converting unit is coupled to the flowmeter to provide an electrical signal prportional to the gross volumetric output. A remotely located motor unit is electrically connected to the outout of the converting unit to mechanically actuate a register for providing a remote gross volumetric recording. An adjustable ratio drive assembly is further coupled to the remotely located motor unit to mechanically actuate a register for providing a temperature compensated remote net volumetric recording. A temperature responsive adjustment assembly is connected to selectively control the drive assembly and is electrically connected to a remote temperature responsive sensor located within the flow line at the meter. The adjustment assembly is thus remotely located and generally in an area not subject to the severe ambient conditions that the meter is subjected to; for example, as in bulk loading stations.

In a preferred form of the invention, a resistive bridge is provided having a fixed voltage input and an output varying in accordance with sensed temperature changes of a liquid flowing in a flow line. The bridge specifically includes a pair of fixed resistors, a variable potentiometer coupled to the output of a reversible motor, and a temperature responsive thermistor placed within the flow line. The bridge circuit output is amplified by a differential amplifier having a parallel connected resistive and capacitive feedback circuit. A pair of switching transistor circuits are connected to the differential amplifier to selectively energize the reversible motor and position a variable element in an adjustable ratio drive assembly according to sensed change in liquid temperature. A pair of limit switches are connected to the reversible motor output and to the switching transistor circuits to selectively de-energize the reversible motor and prevent damage to the drive assembly under excessive temperature variations. In addition, a pair of diodes are connected to the input of the switching transistor circuits to establish a minimum liquid temperature differential to which the reversible motor will respond. The use of a sensing element such as a thermistor allows simple calibration by substituting a known resistance corresponding to a specific temperature in place of the thermistor within the resistive bridge.

The reversible motor may be connected to drive an output shaft having a threaded end adapted to be received within an internally threaded element positioning rod having an anit-rotational guide and therefore movable axially in accordance with the rotation of the output shaft to thereby linearly position the variable element of the adjustable ratio drive assembly. In the alternative, the reversible motor may be coupled to rotate a non-linear cam to thereby actuate a cam follower and non-linearly position the variable element. The cam may specifically provide an outer surface having a varying radius to compensate for variations of the liquid coefficient of expansion according to variations in liquid temperature.

Other objects and advantages will appear in the course of the following description.

BRIEF DESCRIPTION OF THE DRAWINGS

The drawings furnished herewith illustrate the best mode presently contemplated by the inventors and clearly disclose the above advantages and features as well as others which will be readily understood from the detailed description thereof.

In the drawings.

DESCRIPTION OF THE PREFERRED ILLUSTRATED EMBODIMENT

Figure 1:
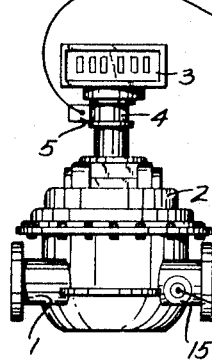
FIG. 1 is a perspective view of a remote monitoring system of a volumetric liquid flowmeter having local and remote gross outputs and a remote temperature compensated net output.
Figure 1:
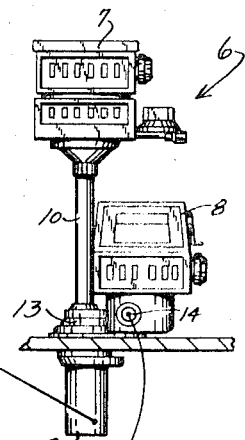

Referring to the drawings and particularly FIG. 1, the illustrated embodiment of the invention includes a flow line 1 adapted to carry a liquid which expands or contracts according to the liquid temperature such as petroleum products in bulk loading plants where the products are stored in large tanks, not shown, for transfer to tank trucks and the like. A meter 2 is connected in series in line 1, normally at a tank loading station, and provides a rotational mechanical output proportional to the volumetric liquid flow. A local recorder 3 is shown connected to meter 2 through a coupling drive unit 4 to provide a local gross registration of the liquid flowing through line 1. The meter 2 may include any suitable turbine or positive displacement volumetric responsive meter while the recorder 3 is adapted to receive a rotating input to provide a visual reading or other record of the flow.

A converter unit 5 is connected to the coupling unit 4 and provides an electrical output signal proportional to the mechanical rotation provided by the output of meter 2 which is correspondingly proportional to the volumetric flow through flow line 1. The converter unit 5 may include a selsyn motor adapted to provide a position responsive signal dependent upon the rotational output of meter 2 and capable of driving a corresponding receiving selsyn motor. A pulse logic transmitter, as shown in U. S. Pat. No. 3,328,659, issued June 27, 1967, to Robert Ryno, may also be employed as a converter unit 5 to provide a pulsed logic output signal proportional to the volumetric flow and capable of operating a corresponding receiving stepper motor.

A monitoring unit 6 remotely located from flowmeter 2 includes a gross counter or register 7 for recording a gross output corresponding to the recording at recorder 3 and a net counter or register 8 for recording a net output compensated according to the liquid temperature sensed at meter 2. Specifically, register 7 is operatively connected to an electrical drive means 9 such as a selsyn or stepper motor through an input shaft 10. The motor 9 is shown electrically connected to the converter unit 5 by a five-wire transmission cable 11 having a suitable protective conduit and is driven in accordance with the electrical signal output of unit 5 to record the gross flow.

In accordance with the present invention, an adjustable ratio drive assembly 12 operatively couples the net register 8 to input shaft 10 through a coupling unit 13. Thus, the motor 9 is effectively coupled to operate the net counter or register 8 according to the output provided by converter unit 5 as modified by the drive assembly 12. An electrically driven temperature compensating adjustment assembly 14 is coupled to vary the drive ratio of the drive assembly 12 and is electrically connected to a temperature responsive thermistor 15 remotely located in flow line 1 at or adjacent flowmeter 2 by an electrical connection 16 which may consist of a two-wire transmission cable or the like.

The temperature of the flowing liquid at the metering point is thus sensed to provide a signal which is transmitted through an ambient insensitive transmission cable to the remotely located temperature responsive adjustment assembly 14 and effectively control the drive ratio of drive assembly 12.

Figure 2:
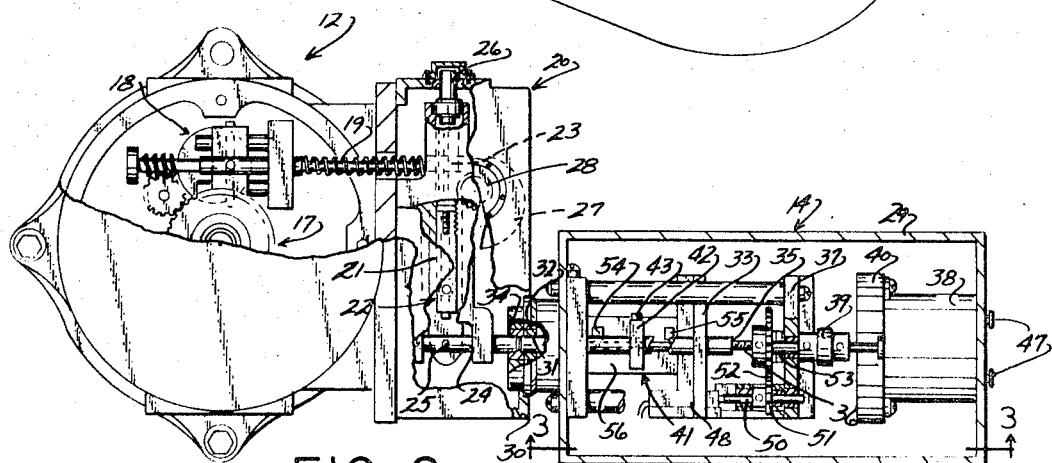
FIG. 2 is a plan view of a variable ratio drive assembly for providing a temperature compensated output and particularly showing a temperature responsive adjustment assembly having a motor for positioning a variable element in the drive assembly.

Referring to FIG. 2, the drive assembly 12 includes a ball integrating type transmission unit such as shown in the patents to Cedel, U. S. Pat. No. 3,417,612, and Steen, U. S. Pat. Nos. 3,088,317 and 3,024,665, all assigned to a common assignee. A roller and disc-type transmission unit, as shown in the patent to Erickson, U. S. Pat. No. 3,135,125, issued June 2, 1964 and assigned to a common assignee, or an eccentric type transmission unit employing overriding clutches may also be effectively utilized for the drive assembly 12.

The illustrated drive assembly 12 is therefore only described in sufficient detail to clearly understand the invention, and includes a planetary or differential transmission system 17 and a ball integrating transmission 18. The rotating output of the motor 9 is coupled to net counter 8 through the transmission 18. A ball positioning shaft 19 is connected to a temperature compensator 20 and is further connected to adjust the ratio setting of the transmission 18.

The temperature compensator 20 includes a lever 21 intermidiately pivoted on a pivot block unit 22. One end of lever 21 is pinned to the ball transmission positioning shaft 19, as at 23, while the opposite end is pinned to a spring loaded temperature responsive plunger 24, as at 25.

In operation, axial movement of plunger 24 selectively pivots lever 21 about the pivot block unit 22 causing reciprocal movement of the ball positioning shaft 19 to thereby control the effective drive coupling between motor 9 and net counter 8. A manual adjustment knob 26 is provided for changing the pivot point of pivot block unit 22 to thereby adjust the response of pivot lever 21 according to the specific gravity of the liquid flowing through the meter 2. A calibrating dial 27 graduated in units of specific gravity forms a part of the compensator 20 and is disposed beneath a viewing window 28 to permit visual reading of the specific gravity setting.

Figure 3:
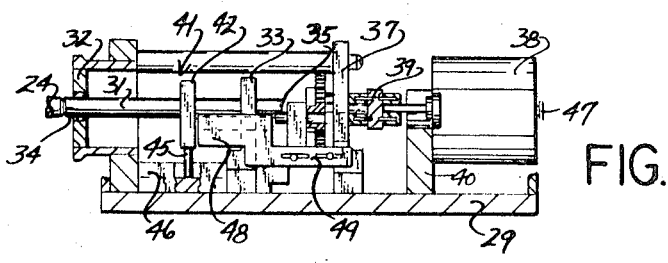
FIG. 3 is a side elevational view of the temperature responsive adjustment assembly shown in FIG. 2.

As shown in FIGS. 2 and 3, the temperature responsive adjustment assembly 14 includes a housing 29 which is bolted, force fitted, or welded to an exterior wall 30 of the adjustable ratio drive assembly 12. A horizontally positioned rod 31 is mounted by an end flange and bushing 32 and a flange bushing 33 for axial movement within housing 29. The rod 31 has one end 34 maintained in engagement with the spring loaded plunger 24, while the other end 35 contains an internal circumferential threaded opening. A threaded shaft 36 is adapted to be received within the internal opening of rod 31 and is supported for rotational movement therein by end flange and bushing 37. A grounded reversible motor 38 is connected to rotate shaft 36 through a coupling 39 and is mounted within housing 29 by a flange 40. The motor 38 may be any suitable unit providing opposite output movements such as a conventional low voltage direct current motor capable of providing a reversible rotational output.

An anti-rotational assembly 41 is secured to shaft 31 by a collar 42 and a screw 43. The collar 42 further contains a pin 45 which is positioned in slidable engagement with a notch or recess 46 formed in an extension of housing 29. The engagement of pin 45 in notch 46 thereby prevents the rotational movement of rod 31 while allowing freedom for axial movement.

The selective energization of motor 38 through a pair of electrical terminals 47, as will be more fully described hereinafter, rotates the input shaft 36 in a direction corresponding to the polarity of the input signal supplied to terminals 47. The direction of rotation of shaft 36 therefore determines the direction of axial movement of rod 31. Since the internal threads of rod 31 engage the external threads of shaft 36, the axial movement of the rod 31 will occur at equal increments corresponding to each degree of rotation provided by shaft 36 for linearly positioning plunger 24 in response to actuation of motor 38.

A variable potentiometer 48 is connected to housing 29 through an adjustable support 49. An input shaft 50 rotatably connected to potentiometer 48 is mounted in suitable bushings and contains a gear 51 mechanically linked to input shaft 36 through a gear 52. A thrust bearing 53 is mounted on shaft 36 and positioned between gear 52 and end flange 37. In operation, the rotation of shaft 36 by motor 38 provides a proportional rotation of shaft 50 to vary the effective resistance of potentiometer 48 in accordance with the temperature compensation provided to the adjustable ratio drive assembly 12 through the plunger 24.

As best shown in FIG. 2, a pair of adjustable limit swtiches 54 and 55 are connected to housing 29 through a plate 56 and are selectively activated by the pin 45 of assembly 41. The switches 54 and 55 are positioned to prevent over-travel of the rod 31 which might damage the adjustment assembly 14. Activation of either switch 54 or 55 by over-travel of rod 31 will de-energize the reversible motor 38 until a reversing control signal is received, as will be more fully described hereinafter.

An electrical control circuit is contained within housing 29 of the adjustment assembly 14 and connected to terminals 47 to selectively energize the reversible motor 38. The control circuit is also connected to the thermistor 15 located within the flow line 1 by the transmission cable 16, as shown in FIG. 1.

The thermister 15 is a temperature responsive element having resistive qualities which vary in response to changes in the termperature condition in the surrounding medium. A thermistor to be employed in a liquid flow line is generally selected to provide a differential range of resistance change that is approximately linearly proportional to the differential range of temperature change experienced under normal operating conditions. Furthermore, the variable potentiometer 48 is selected to have a resistive range corresponding to the resistive range of thermistor 15 within the normal operating temperatures.

Figure 4:
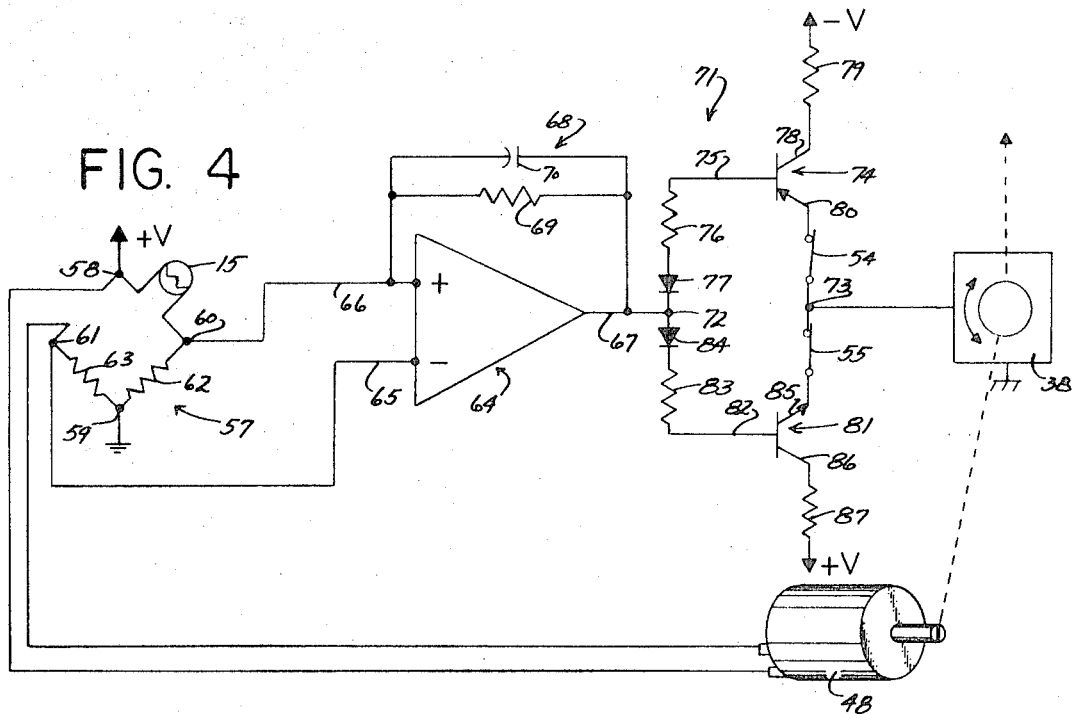
FIG. 4 is a schematic view of an electrical circuit for providing a control signal to compensate the adjustment assembly shown in FIGS. 2 and 3 and including a temperature responsive liquid sensor.

Referring to FIG. 4, a bridge circuit 57 includes the thermistor 15 and the adjustable potentiometer 48 as elements. Specifically, operating power is supplied to bridge 57 through a pair of input terminals 58 and 59 by a constant voltage source designated as "+V" and ground, respectively. An output terminal 60 is connected to input terminal 58 through the thermistor 15 while an output terminal 61 is connected to input terminal 58 through the variable potentiometer 48. The output terminals 60 and 61 are further connected to input terminal 59 through a pair of fixed resistors 62 and 63, respectively.

The fixed resistors 62 and 63 are selected to be approximately equal so that a balanced bridge dircuit exists whenever the resistance of thermistor 15 is approximately equal to the resistance of the variable potentiometer 48 to thereby provide a null or zero outut signal to output terminals 60 and 61. An effective change in resistance of thermistor 15 will therefore unbalance the bridge circuit 47 so that a potential difference will exist across the output terminals 60 and 61. The voltage output thereby supplied by bridge circuit 57 will be maintained until either the liquid temperature returns to the initial temperature condition or the resistance of the variable potentiometer 48 varies to re-establish a balanced bridge circuit. The relative voltage polarity between output terminals 60 and 61 is determined according to the resistance of thermistor 15 being greater or less than the resistance of potentiometer 48.

A differential amplifying section 64 includes a non-inverting input 65 connected to output terminal 61 and an inverting input terminal 66 connected to output terminal 60. The amplifying section 64 contains an output terminal 67 and a feedback circuit 68 connected to the inverting input terminal 66 and the output terminal 67. The feedback circuit 68 has a parallel connected resistor 69 and capacitor 70 so that the amplifying section 64 provides a linear output in response to the voltage signal supplied by bridge circuit 57.

A switching circuit 71 is connected to output terminal 67 of amplifying section 64 through an input terminal 72 and to the grounded reversible motor 38 through an output terminal 73. A switching transistor 74 of the PNP type is selectively biased to conduct according to an output signal of proper polarity from the amplifier 64. Specifically, the transistor 74 has a base input 75 connected to input terminal 72 through a resistor 76 and a threshold diode 77 to establish a dead band to prevent hunting within significant temperature variations. The transistor 74 further includes a collector 78 connected through a resistor 79 to a D.C. constant voltage source designated as "–V" and an emitter 80 connected to ground through motor 38, output terminal 73, and the limit switch 54. An output signal of negative polarity provided by the grounded amplifier 64 will therefore bias transistor 74 on if of sufficient magnitude to overcome the conducting threshold of diode 77. Specifically, a circuit will exist from grounded motor 38 through emitter 80, base 75, resistor 76 and diode 77 to the grounded amplifier 64 sufficient to turn transistor 74 on and provide a conducting emitter-collector circuit sufficient to energize the motor 38. A switching transistor 81 of the NPN type is selectively biased to conduct according to an output signal of proper polarity from the amplifier 64. Specifically, the transistor 81 has a base input 82 connected to input termianl 72 through a resistor 83 and a threshold diode 84 similar to diode 77. An emitter 85 is connected to ground through motor 38, output terminal 73, and the limit switch 55 and a collector 86 is connected to a D.C. constant voltage source designated as "'V" through a resistor 87. An output signal of positive polarity provided by the grounded amplifier 64 will therefore bias transistor 81 on if of sufficient magnitude to overcome the conducting threshold of diode 84 in a manner similar to the operation of transistor 74.

In operation, a sufficient positive signal existing at input terminal 72 will therefore bias transistor 81 to conduct and actuate motor 38 to rotate shaft 36 in a first direction. In like manner, a sufficient negative signal appearing at terminal 72 will bias transistor 74 to conduct and actuate motor 38 to rotate shaft 36 in a second direction. The polarity of the signal supplied to terminal 72 will depend on the relative polarity existing at output terminals 60 and 61 of bridge circuit 57, as previously described.

The energization of reversible motor 38 and subsequent rotation of shaft 36 will vary the resistance of potentiometer 48 through the gears 51 and 52, as previously described. Thus, a signal established by an unbalanced bridge circuit 57 to energize motor 38 will effectively rotate the shaft 36 and vary the resistance of potentiometer 48 to reestablish a balanced bridge circuit 57. The plunger 24 of the drive assembly 12 is therefore axially positioned by the rotating shaft 36 through rod 31 to establish a new drive ratio corresponding to the liquid temperature in flow line 1.

The pair of diodes 77 and 84 are selected to require a threshold signal level at terminal 72 before effectively conducting to bias the base circuits 75 and 82 of transistors 74 or 81, respectively. Thus, a dead zone is provided by diodes 77 and 84 so that small variations in liquid temperature within flow line 1 will not activate motor 38. The pair of limit switches 54 and 55, as previously described, are positioned to be actuated by the pin 45 to prevent a deterimental over-travel of rod 31 and plunger 24. Specifically, actuation of either siwtch 54 or switch 55 will disconnect the respective conducting transistor 74 or 81 to thereby de-energize motor 38. As the temperature of the liquid within flow line 1 returns to the normal operating range of the temperature compensator 20, motor 38 will again be effective to position plunger 24 according to the changing liquid temperature.

Figure 7:
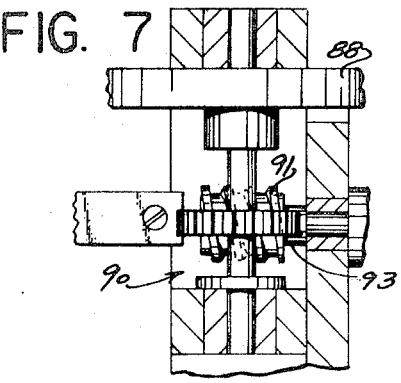
FIG. 7 is a fragmentary view showing a worm and worm gear connected to drive the cam shown in FIGS. 5 and 6.
Figure 5:
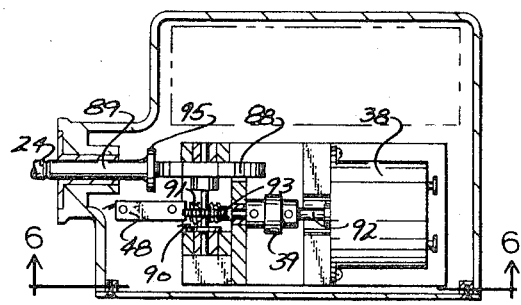
FIG. 5 is a plan view of another embodiment of the temperature responsive adjustment assembly shown in FIGS. 2 and 3 and further includes a cam operated actuating assembly.
Figure 6:
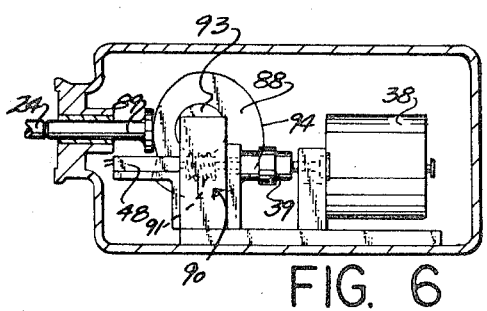
FIG. 6 is a side elevational view of the temperature responsive adjustment assembly shown in FIG. 5.

Referring to FIGS. 5, 6 and 7, an irregularly shaped cam 88 is connected to control the axial position of a cam follower 89 which, in turn, engages the spring loaded plunger 24 of drive assembly 12. Specifically, the motor 38 is coupled to rotate the cam 88 through a gear mechanism 90 having a worm 91 connected to a motor shaft 92 through the coupling 39. The shaft 92 is further connected to the variable potentiometer 48 to vary the effective feedback resistance as previously described. A worm gear 93 is coupled to be driven by the worm 91 and is further connected to rotate cam 88 according to the rotation of shaft 92 of motor 38.

The irregularly shaped cam 88 has a varying radius to provide an outer surface 94 which slidably engages the cam follower 89 at an end 95 and is therefore axially adjusted by motor 38 through the gear mechanism 90. Each degree of rotation of cam 88 will produce a varying incremental response by cam follower 89 to provide a plurality of varying incremental changes to plunger 24. By properly varying the radius of cam follower 89, the changing coefficient of liquid expansion with respect to temperature will be properly compensated by drive assembly 12 according to the non-linear response of cam follower 89.

The temperature compensated volumetric responsive monitoring system of the present invention therefore provides for the remote monitoring of a liquid flow through a pipeline system. The use of a sensing element such as a thermistor allows simple calibration prior to installation by simply substituting a known resistance corresponding to a specific temperature for the thermistor 15. The value of the substituted resistance may therefore be varied to correspond to the possible varied temperature conditions commonly found within the liquid in flow line 1.

Various modes of carrying out the invention are contemplated as being within the scope of the following claims particularly pointing out and distinctly claiming the subject matter which is regarded as the invention.

I claim:

1. An apparatus for providing temperature compensation in a system monitoring the volumetric liquid flow through a flow line, comprising
   a first output means including a local register and connected to said flow line for providing an output to drive said local register for providing a local gross registration proportional to the volumetric liquid flow,
   a sensing means including a thermistor having an impedance varying approximately linearly with sensed temperature connected to said flow line for providing an electrical signal proportional to the change in liquid temperature,
   a second output means electrically connected to said first output means and including a first remote register for providing a remote gross registration proportional to said local gross registration and a second register including an adjustable drive assembly, a compensating means including a motor, a variable element actuated by said motor and connected to control said adjustable drive assembly, and
   a control circuit including a differential amplifier and a switching circuit connected to said sensing means for providing an electrical signal proportional to the change in temperature of said liquid and electrically connected to said motor of said compensating means through said differential amplifier and switching circuit for selectively energizing said motor in accordance with changes in the temperature of the liquid to provide a temperature compensated recording at said second remote register.

2. The apparatus of claim 1, wherein said control circuit includes means for providing a resistive impedance varying in response to energization of said motor, and said thermistor provides a resistive impedance varying in response to liquid temperature.

3. The apparatus of claim 2, wherein said control circuit means includes a pair of resistive impedance elements connected in bridge circuit configuration with said motor actuated impedance means and said sensing means, said bridge circuit having a constant input signal and providing an output signal varying in accordance to the difference in impedance betw between motor actuated impedance means and said sensing means.

4. The apparatus of claim 3, wherein said differential amplifier is connected to receive said output signal from said bridge circuit for providing an amplified signal proportional to said output signal to said switching circuit for selectively energizing said motor means.

5. An apparatus to adjust a variable element connected to control an adjustable drive assembly of a temperature compensated meter responsive to the volumetric liquid flow through a flow line, comprising
   a compensating means connected to said meter and including a motor means to position said element for modifying the response of said meter, and
   a control circuit means including a sensing means connected to said flow line for providing an electrical signal proportional to the change in temperature of said liquid and a switching circuit electrically connected to said sensing means and having a pair of parallel connected transistors each having a base circuit mutually connected to a common input terminal and an emitter circuit connected to a common output terminal, said base circuits each containing a diode and said emitter circuits each containing a limit switch selectively actuated by said motor means for selectively energizing said motor means in accordance with changes in temperature of the liquid.

6. The apparatus of claim 1, wherein caid compensating means further includes a cam rotatably connected to said motor, a cam follower engaging said cam and connected to position said variable element according to changes in sensed liquid temperature, said cam having a varying radius engaging said cam follower to position said variable element according to the varying coefficient of expansion of the liquid according to the temperature change.

7. A circuit to selectively energize a reversible motor for controlling the position of a variable element connected to control a temperature compensated meter responsive to the volumetric liquid flow through a flow line, comprising
   a bridge circuit means having an output circuit and including a temperature responsive element connected to said flow line and a position sensitive element connected to said motor to sense the motor output for providing a signal proportional to changes in liquid temperature, and
   a switching circuit means including a pair of parallel connected transistors electrically connected to said output circuit for selectively energizing said reversible motor in accordance with the magnitude and polarity of the signal proportional to changes in liquid temperature, and further including a disconnect means connected to sense the maximum operating limits of said variable element for de-energizing said reversible motor to prevent damage to said meter.

8. The apparatus of claim 5 wherein said pair of diodes establishes a minimum liquid temperature differential to which said motor means will respond.

* * * * *